(12) United States Patent
Cartier

(10) Patent No.: US 8,887,764 B2
(45) Date of Patent: Nov. 18, 2014

(54) WATER FAUCET WITH TRIPLE-SET CONTROLLER

(71) Applicant: Dany Cartier, La Tuque (CA)

(72) Inventor: Dany Cartier, La Tuque (CA)

(*) Notice: Subject to any disclaimer, the term of this patent is extended or adjusted under 35 U.S.C. 154(b) by 16 days.

(21) Appl. No.: 13/653,708

(22) Filed: Oct. 17, 2012

(65) Prior Publication Data

US 2014/0102569 A1    Apr. 17, 2014

Related U.S. Application Data

(60) Provisional application No. 61/627,709, filed on Oct. 17, 2011.

(51) Int. Cl.
*F16K 11/078* (2006.01)
*E03C 1/04* (2006.01)

(52) U.S. Cl.
USPC ............... 137/625.4; 137/625.17; 4/676

(58) Field of Classification Search
USPC ......... 137/625.4, 625.41, 625.17, 606; 4/676, 4/677
See application file for complete search history.

(56) References Cited

U.S. PATENT DOCUMENTS

| 4,697,614 | A | * | 10/1987 | Powers et al. | 137/337 |
| 5,135,021 | A | * | 8/1992 | Pegg | 137/337 |
| 5,452,740 | A | * | 9/1995 | Bowman | 137/337 |
| 7,464,418 | B2 | * | 12/2008 | Seggio et al. | 4/623 |
| 2009/0293961 | A1 | * | 12/2009 | McMurtry | 137/337 |

* cited by examiner

*Primary Examiner* — Elizabeth Houston
*Assistant Examiner* — Michael R Reid
(74) *Attorney, Agent, or Firm* — Equinox IP; Franz Bonsang

(57) ABSTRACT

A faucet comprises a spout, and a valve assembly that can be positioned in at least three different positions so as to draw water from a cold water reservoir, a hot water reservoir and lukewarm water reservoir. The valve assembly may comprise three valves, one valve for opening and closing the flow of water between each valve and the reservoirs. The lukewarm water reservoir receives water from the cold water reservoir which sits therein and raises up to room temperature. At least one handle provides for controlling the valves of the faucet so as to draw water from each reservoir or simultaneously from at least two reservoirs. A plumbing system including the faucet, conduits for each reservoir and a lukewarm water reservoir is also provided.

10 Claims, 5 Drawing Sheets

WATER FAUCET WITH TRIPLE-SET CONTROLLER

CROSS-REFERENCE TO RELATED APPLICATIONS

This application claims priority of U.S. Provisional Application for Patent No. 61/627,709 filed Oct. 17, 2011, the content of which is incorporated herein by reference in its entirety.

FIELD OF THE INVENTION

The present disclosure relates to a water faucet. More particularly, but not exclusively, the present disclosure relates to a water faucet with a triple-set controller, and the plumbing assembly in use therewith.

BACKGROUND OF THE INVENTION

Sinks typically have faucets that supply hot and cold water and may include a spray feature to be used for faster rinsing. In essence, a faucet is a valve controlling release of liquids that is commonly found in bathroom, laundry or kitchen sinks. Usually, a faucet includes a single spout for both hot and cold water and a single or double handle. In any case, the single handle or double handle provide for drawing water from a hot water reservoir or a cold water reservoir.

Often users will mix the hot and cold water in order to get a desired lukewarm water which is wasteful since the user will draw water from the hot water tank without the need of hot water.

Accordingly, there is a need for an improved water faucet.

SUMMARY OF THE INVENTION

It is therefore a general object of the present invention to provide an improved water faucet.

An advantage of the present invention is that the water faucet has a triple-set controller.

Another advantage of the present invention is that the water faucet has a plumbing assembly comprising a water faucet triple-set controller and a cold water tank, a hot water tank and a lukewarm tank.

According to an aspect of the present invention there is provided a faucet comprising:
  a spout;
  a valve assembly in fluid communication with the spout and being movable between at least a first position, a second position and a third position, the valve assembly providing for being in fluid communication with a cold water reservoir, a hot water reservoir and a lukewarm water reservoir; and
  at least one handle for moving the valve assembly between, the first, second and third positions;
  wherein when the valve assembly is positioned in the first, second and third positions it respectively draws water from the cold water reservoir, hot water reservoir, and lukewarm water reservoir.

According to another aspect of the present invention there is provided a faucet comprising:
  a spout;
  a first valve in fluid communication with the spout and in fluid communication with a cold water reservoir;
  a second valve in fluid communication with the spout and in fluid communication with a hot water reservoir;
  a third valve in fluid communication with a lukewarm water reservoir; and
  at least one handle for opening and closing said first, second and third valves so as to respectively draw water from the cold water reservoir, hot water reservoir and lukewarm water reservoir.

According to another aspect of the present invention there is provided a plumbing assembly comprising:
  a faucet comprising a spout and a valve assembly in fluid communication with the spout, the valve assembly being movable between at least a first position, a second position and a third position;
  a cold water conduit providing for fluid communication between the valve assembly and a cold water reservoir;
  a hot water conduit providing for fluid communication between the valve assembly and a hot water reservoir;
  a lukewarm water reservoir for being in fluid communication with the valve assembly; and
  at least one handle for moving the valve assembly between, the first, second and third positions;
  wherein when the valve assembly is positioned in the first, second and third positions it respectively draws water from the cold water reservoir, hot water reservoir and lukewarm water reservoir.

According to another aspect of the present invention there is provided a plumbing assembly comprising:
  a faucet comprising a spout, first, second and third valves and at least one handle for opening and closing the first, second and third valves;
  a first conduit in fluid communication with a cold water reservoir and with the first valve;
  a second conduit in fluid communication with a hot water reservoir and with the second valve; and
  a lukewarm water reservoir for being in fluid communication with a lukewarm water reservoir and with the third valve;
  wherein the lukewarm water reservoir receives water from the cold water reservoir and wherein the handle provides for opening and closing the first, second and third valves no as to respectively draw water from the cold water reservoir, hot water reservoir and lukewarm water reservoir.

According to a further aspect of the present invention there is provided a faucet comprising:
  a spout;
  a valve assembly in fluid communication with the spout and being movable between at least a first position, a second position and a third position, the valve assembly providing for being in fluid communication with a cold water reservoir, a lukewarm water reservoir and a hot water reservoir; and
  at least one handle for moving the valve assembly between, the first, second and third positions;
  wherein when the valve assembly is positioned in the first, second and third positions, the valve assembly respectively draws water from the cold water reservoir, lukewarm water reservoir, and hot water reservoir.

In one embodiment, the valve assembly includes a valve structure being in fluid communication with the cold water reservoir, the lukewarm water reservoir and the hot water reservoir, and being movable between the at least first position, second and third positions, the at least one handle connecting to the valve structure for moving the valve structure between the first, second and third positions.

Conveniently, the valve structure is further movable between at least one cold intermediate position between the first position and the second position so as to simultaneously draw water from the cold water reservoir and the lukewarm water reservoir.

Conveniently, the valve structure is further movable between at least one hot intermediate position between the second position and the third position so as to simultaneously draw water from the lukewarm water reservoir and the hot water reservoir.

In one embodiment, the valve assembly includes:
a first valve in fluid communication with the spout and with the cold water reservoir and the lukewarm water reservoir;
a second valve in fluid communication with the spout and with the lukewarm water reservoir and the hot water reservoir;
wherein the at least one handle for opening and closing said first and second valves so as to respectively draw water from the cold water reservoir, lukewarm water reservoir and hot water reservoir.

Conveniently, the at least one handle includes:
a first handle for opening and closing said first valve so as to draw water from the cold water reservoir and the lukewarm water reservoir; and
a second handle for opening and closing said second valve so as to draw water from the lukewarm water reservoir and the hot water reservoir.

Conveniently, the first valve is movable between at least one cold intermediate position between the first position and the second position so as to simultaneously draw water from the cold water reservoir and the lukewarm water reservoir with the first handle.

Conveniently, the second valve is movable between at least one hot intermediate position between the second position and the third position so as to simultaneously draw water from the lukewarm water reservoir and the hot water reservoir with the second handle.

In one embodiment, the valve assembly includes:
a first valve in fluid communication with the spout and with the cold water reservoir;
a second valve in fluid communication with the spout and with the lukewarm water reservoir;
a third valve in fluid communication with the spout and with the hot water reservoir; and
at least one handle for opening and closing said first, second and third valves so as to respectively draw water from the cold water reservoir, lukewarm water reservoir and hot water reservoir.

Conveniently, the at least one handle is movable between at least one cold intermediate position between the first position and the second position so as to simultaneously draw water from the cold water reservoir and the lukewarm water reservoir.

Conveniently, the at least one handle is movable between at least one hot intermediate position between the second position and the third position so as to simultaneously draw water from the lukewarm water reservoir and the hot water reservoir.

According to a further aspect of the present invention there is provided a plumbing assembly comprising:
a faucet as defined hereinabove;
a cold water conduit providing for fluid communication between the valve assembly and the cold water reservoir;
a hot water conduit providing for fluid communication between the valve assembly and the hot water reservoir; and
a lukewarm water conduit for fluid communication between the valve assembly and the lukewarm water reservoir.

Conveniently, the lukewarm water reservoir receives water from the cold water reservoir.

It should be noted the terms "first", "second" and "third" are used herein arbitrarily for indicative purposes only and as such are interchangeable.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE INVENTION

With reference to the annexed drawings the preferred embodiment of the present invention will be herein described for indicative purpose and by no means as of limitation.

Generally stated, in accordance with an embodiment of the disclosure, there is provided a faucet that comprises a spout, and a valve assembly that can be positioned in at least three different positions so as to draw water from a cold water reservoir, a hot water reservoir and lukewarm water reservoir. The valve assembly may comprise three valves, one valve for opening and closing the flow of water between each valve and the reservoirs. The lukewarm water reservoir receives water from the cold water reservoir which sits therein and drops to room temperature. At least one handle provides for controlling the valves of the faucet so as to draw water from each reservoir or from at least two reservoirs at the same time. A plumbing system including the faucet, conduits for each reservoir and a lukewarm water reservoir is also provided.

Obviously, although not shown herein, the warm water of the lukewarm reservoir could be warmed at a temperature slightly above room temperature, such as about 85° F. (about 30° C.) using a heat source such as, but not limited to, the sun, electrical power, heat from a surrounding baseboard heater, or heat from hot waste water (via a heat exchanger or the like).

Figure 1:
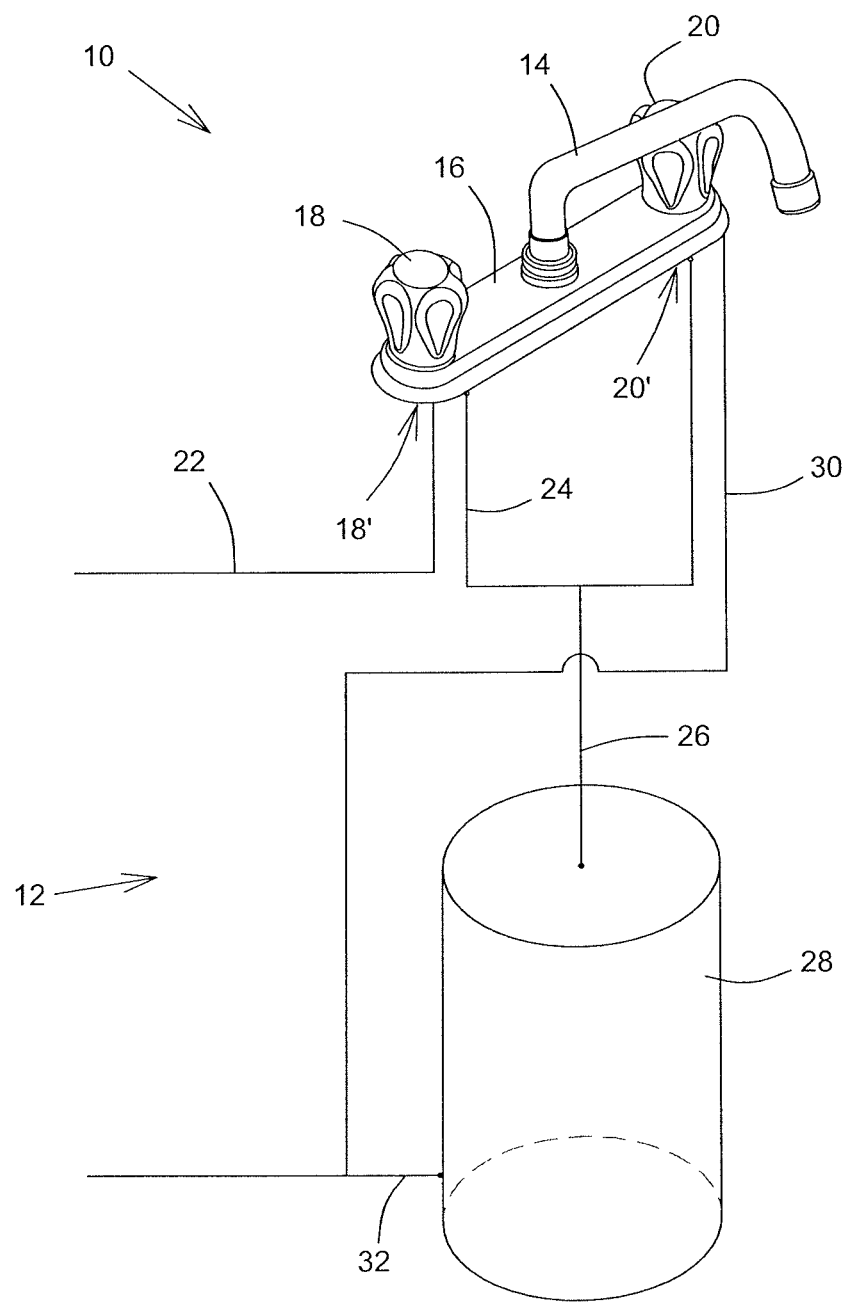
FIG. 1 is a schematic representation of the water faucet in accordance with an illustrative embodiment of the present description and the plumbing circuit connected thereto.

FIG. 1 shows a faucet 10 in fluid communication with a plumbing circuit 12 thereby defining a plumbing assembly.

The faucet 10 includes a faucet spout 14 extending from a base member 16 and including a pair of handles 18 and 20.

Each handle 18 and 20 controls a respective valve 18', 20' for selectively opening and closing the flow of water. Handle 18 is in fluid communication with a hot water conduit 22 that leads to the hot water reservoir or tank (not shown but well known in the art) as well as a bifurcated conduit 24 that is in fluid communication with a lukewarm water conduit 26 leading to a lukewarm water reservoir or tank 28.

Handle 20 is in fluid communication with a cold water conduit 30 that leads to the cold water aqueduct (not shown but well known in the art) and with the bifurcated conduit 24 leading to the lukewarm conduit 26 which is in fluid communication with the lukewarm water tank 28.

The cold water conduit 30 is also in fluid communication with the lukewarm water tank 28 via an ancillary conduit 32.

The lukewarm water tank 28 contains water derived from the cold water conduit 30 via the ancillary conduit 32, which is maintained therein at room temperature.

In operation, the user can control handle 18 in order to actuate the valve 18' so as to either draw water from conduit 22, which will flow into the spout 14 or from the bifurcated conduit 24. Similarly, handle 20 can draw water from the cold water conduit 30 or from the bifurcated conduit 24 by actuating the valve 20', which allows for water flow from each respective conduit 24 and 30 into the spout 14.

When water is drawn from the bifurcated conduit 24, cold water will also flow into the reservoir tank 28 via the ancillary conduit 32 thereby filling up the water tank 28. Water is maintained therein and its temperature raises up to room temperature.

Handles 18 and 20 can respectively and selectively draw water from the conduits 24 and 26 thereby drawing the water out of reservoir tank 28 which can be refilled again via the aqueduct through conduit 30 and the ancillary conduit 32.

In this way, the user can mix hot water with lukewarm water by adjusting handle 18 to the hot water position and handle 20 to the lukewarm water position. The user can mix lukewarm water and cold water by adjusting handle 18 to the lukewarm water position and handle 20 to the cold water position. The user can draw only lukewarm water by adjusting both handles 18 and 20 to the lukewarm water position, respectively. Finally, as is known in the art, the handles 18 and 20 can provide for mixing hot and cold water.

Figure 2:
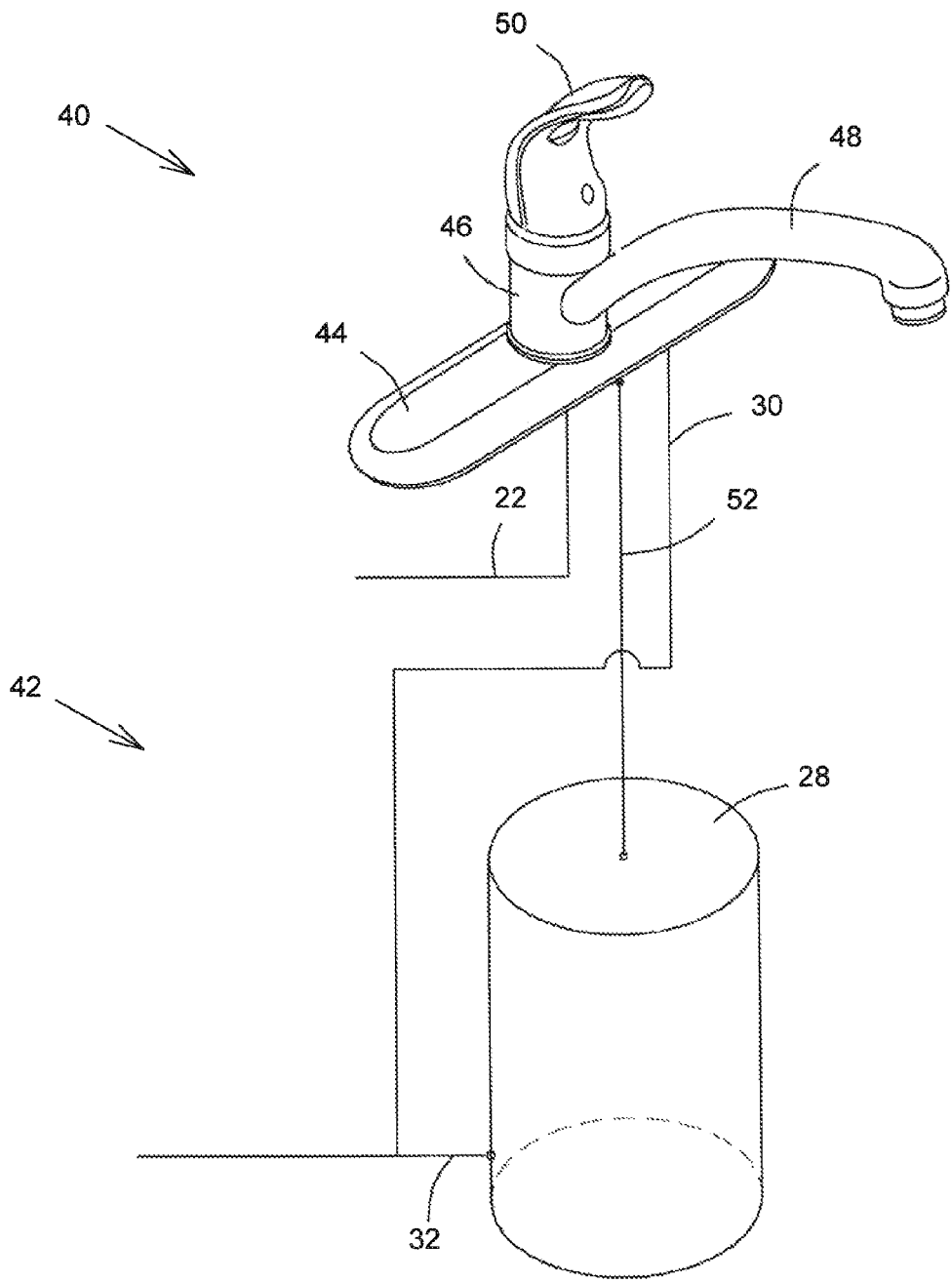
FIG. 2 is a schematic representation of the water faucet in accordance with another illustrative embodiment of the present disclosure and the plumbing circuit connected thereto.

FIG. 2 shows a faucet 40 connected to a plumbing circuit 42 thereby defining a plumbing assembly.

The faucet 40 includes a base 44 with a neck 46 upstanding therefrom and supporting a spout 48. A single handle 50 is mounted to the neck 46. The single handle 50 controls a valve structure (not shown) providing flow from a hot water conduit 22, a cold water conduit 30 and a lukewarm conduit 52.

The lukewarm water conduit 52 leads to a reservoir 28 which receives cold water from conduit 30 via an ancillary conduit 32 and maintains it therein so as to raise up to room temperature.

The handle 50 controls the valves for allowing water flow from either one of the conduits 22, 52 and 30 as well as for mixtures between the aforementioned conduits. As such, the user can mix hot and lukewarm water by allowing flow from both conduits 22 and 52. The user can mix lukewarm and cold water by allowing partial flow from both conduits 52 and 30 and finally the user can allow a mixture of hot and cold water by allowing partial flow from both conduits 22 and 30.

Turning now to FIGS. 3 to 11, the is shown a faucet controller 60 for a faucet, comprising a handle 62 pivotally mounted to a base 64 via pivot 66 and having valve structure 68 with curved opening 70 for allowing water from the hot water opening 72, the cold water opening 74 or the ambient/warm water opening 76 to flow there through and into the faucet spout for discharge. As explained before, the user can select water from one of the opening 72, 74 or 76 to be released or can select mixtures from the three available water temperatures.

Figure 3:
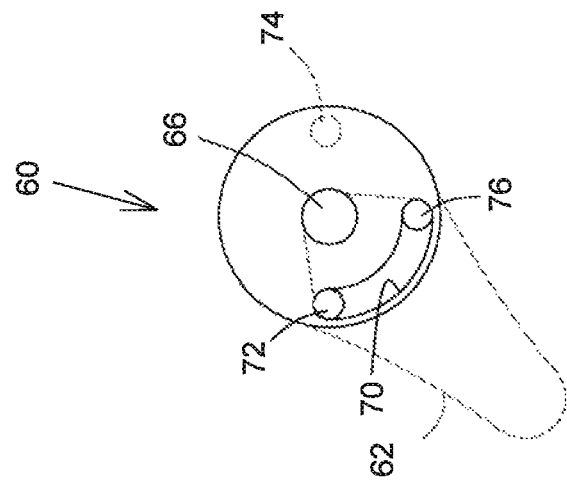
FIGS. 3 to 11 are schematic views of the operation of a faucet controller in accordance with an illustrative embodiment of the present disclosure.

In FIG. 3, the handle 62 is positioned to provide hot water only.

Figure 7:
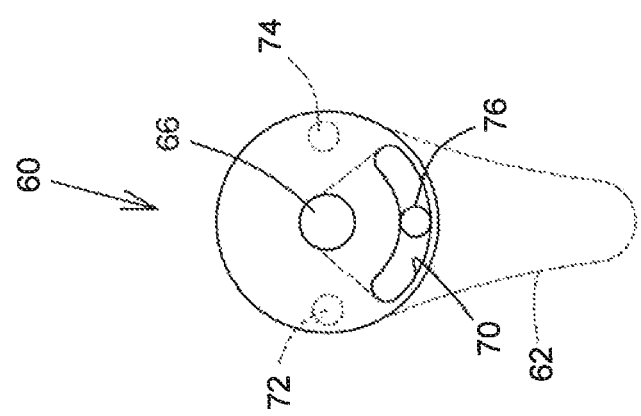
Figure 11:
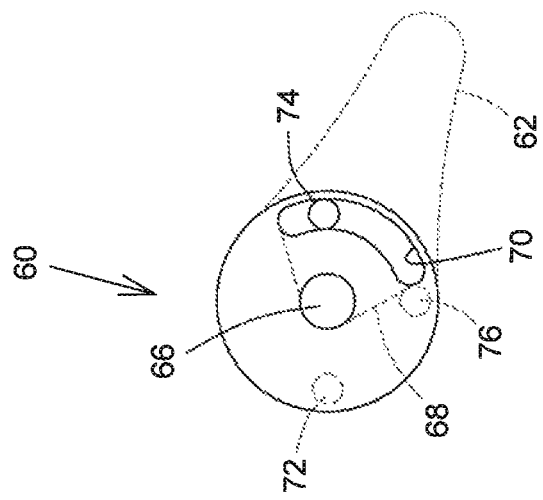

FIG. 7 shows the handle so positioned as to provide warm water only. The position of FIG. 11 provides for full cold water flow. Yet, as explained above various mixtures are possible.

Figure 4:
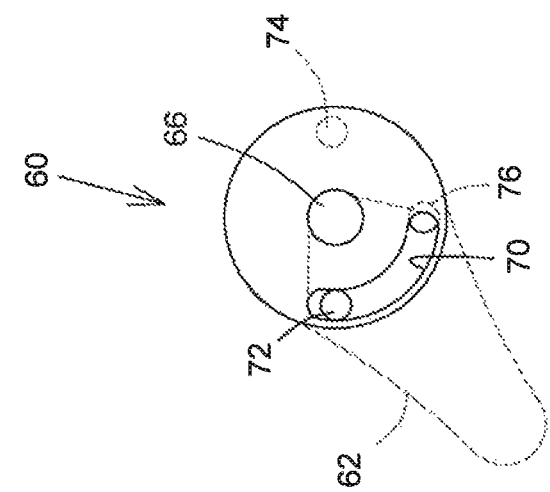
Figure 5:
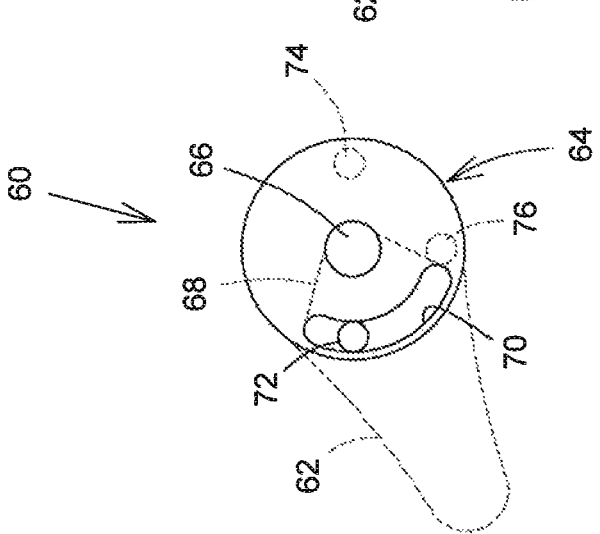
Figure 6:
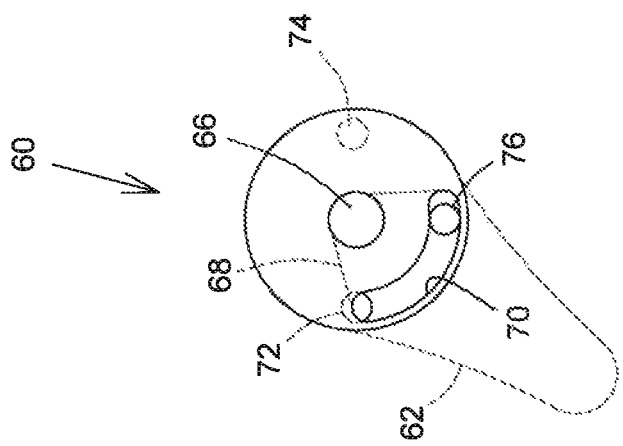

For example, in FIGS. 4, 5 and 6, the handle is so positioned in hot intermediate positions as to provide mixtures of hot and warm (or ambient) water. The position of FIG. 4, allows for full hot water flow and partial warm water flow. The position of FIG. 5 allows for full hot and warm water flow. The position of FIG. 6 allows for partial hot water flow and full warm water flow.

Figure 8:
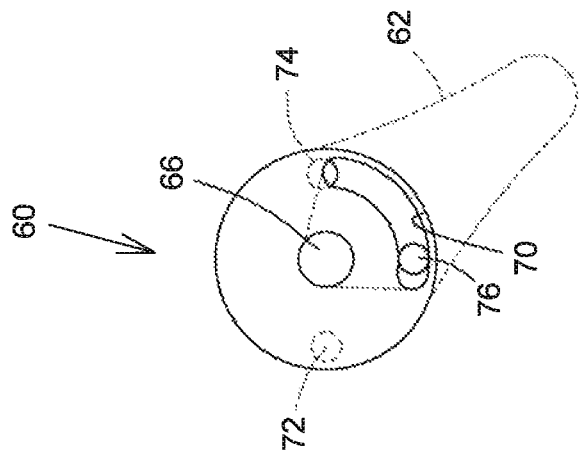
Figure 10:
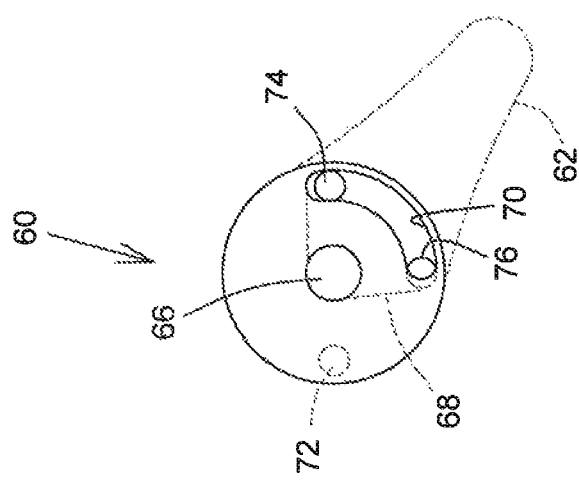
Figure 9:
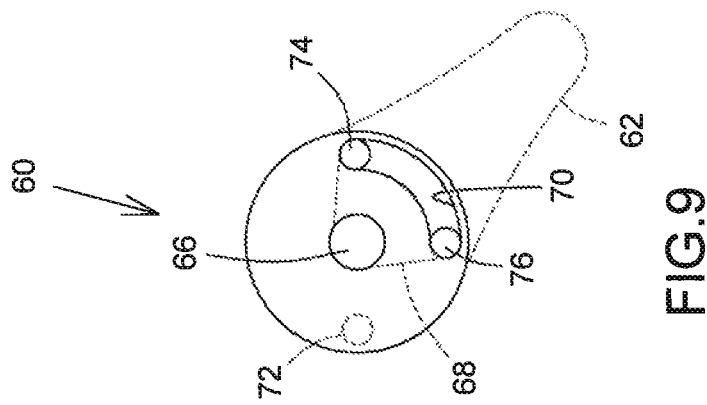

In FIGS. 8, 9 and 10 the handle is so positioned in cold intermediate positions as to provide mixtures of hot and warm (or ambient) water. The position of FIG. 8, allows for full warm water flow and partial cold water flow. The position of FIG. 9 allows for full warm and cold water flow. The position of FIG. 10 allows for partial warm water flow and full cold water flow.

Of course, although not specifically shown, hot and cold water can be mixed in a similar manner.

The various features described herein can be combined in a variety of ways within the context of the present description so as to provide still other embodiments. It is to be understood that the present description is not limited in its application to the details of construction and parts illustrated in the accompanying drawings and described hereinabove. The description is capable of other embodiments and of being practiced in various ways. It is also to be understood that the phraseology or terminology used herein is for the purpose of description and not limitation. Hence, although the present description has been provided hereinabove by way of non-restrictive illustrative embodiments thereof, it can be modified, without departing from the scope, spirit and nature thereof.

I claim:

1. A faucet comprising:
a spout;
a valve assembly in fluid communication with the spout and being movable between at least a first position, a second position and a third position, the valve assembly providing for being in fluid communication with a cold water reservoir, a lukewarm water reservoir and a hot water reservoir; and
at least one handle for moving the valve assembly between, the first, second and third positions;
wherein when the valve assembly is positioned in the first, second and third positions, the valve assembly respectively draws water from the cold water reservoir, lukewarm water reservoir, and hot water reservoir.

2. The faucet of claim 1, wherein the valve assembly includes a valve structure being in fluid communication with the cold water reservoir, the lukewarm water reservoir and the hot water reservoir, and being movable between the at least first position, second and third positions, the at least one handle connecting to the valve structure for moving the valve structure between the first, second and third positions.

3. The faucet of claim 2, wherein the valve structure is further movable between at least one cold intermediate position between the first position and the second position so as to simultaneously draw water from the cold water reservoir and the lukewarm water reservoir.

4. The faucet of claim 3, wherein the valve structure is further movable between at least one hot intermediate position between the second position and the third position so as to simultaneously draw water from the lukewarm water reservoir and the hot water reservoir.

5. The faucet of claim 1, wherein the valve assembly includes:

a first valve in fluid communication with the spout and with the cold water reservoir and the lukewarm water reservoir;

a second valve in fluid communication with the spout and with the lukewarm water reservoir and the hot water reservoir;

wherein two handles are provided for opening and closing said first and second valves so as to respectively draw water from the cold water reservoir, lukewarm water reservoir and hot water reservoir.

6. The faucet of claim 5, wherein the two handles include:

a first handle for opening and closing said first valve so as to draw water from the cold water reservoir and the lukewarm water reservoir; and a second handle for opening and closing said second valve so as to draw water from the lukewarm water reservoir and the hot water reservoir.

7. The faucet of claim 6, wherein the first valve is movable between at least one cold intermediate position between the first position and the second position so as to simultaneously draw water from the cold water reservoir and the lukewarm water reservoir with the first handle.

8. The faucet of claim 7, wherein the second valve is movable between at least one hot intermediate position between the second position and the third position so as to simultaneously draw water from the lukewarm water reservoir and the hot water reservoir with the second handle.

9. A plumbing assembly comprising:

a faucet as defined in claim 1;

a cold water conduit providing for fluid communication between the valve assembly and the cold water reservoir;

a hot water conduit providing for fluid communication between the valve assembly and the hot water reservoir; and a lukewarm water conduit for fluid communication between the valve assembly and the lukewarm water reservoir.

10. The plumbing assembly of claim 9, wherein the lukewarm water reservoir receives water from the cold water reservoir.

* * * * *